(12) United States Patent
Maguire

(10) Patent No.: US 8,747,028 B2
(45) Date of Patent: *Jun. 10, 2014

(54) CONTAINER EMPTYING APPARATUS AND METHOD

(76) Inventor: Stephen B. Maguire, West Chester, PA (US)

( * ) Notice: Subject to any disclaimer, the term of this patent is extended or adjusted under 35 U.S.C. 154(b) by 129 days.

This patent is subject to a terminal disclaimer.

(21) Appl. No.: 13/361,373

(22) Filed: Jan. 30, 2012

(65) Prior Publication Data

US 2012/0269587 A1 Oct. 25, 2012

Related U.S. Application Data

(63) Continuation-in-part of application No. 12/102,454, filed on Apr. 14, 2008, now Pat. No. 8,104,997.

(51) Int. Cl.
*B65G 53/48* (2006.01)
*B65G 65/36* (2006.01)
*B65G 53/42* (2006.01)

(52) U.S. Cl.
CPC ............... *B65G 65/36* (2013.01); *B65G 53/42* (2013.01)
USPC ............ 406/128; 406/141; 406/135; 406/113

(58) Field of Classification Search
USPC ............ 406/52, 69, 113–116, 122, 135, 141, 406/145, 196
See application file for complete search history.

(56) References Cited

U.S. PATENT DOCUMENTS

| | | |
|---|---|---|
| 1,407,510 A | 2/1922 | Bentham |
| 2,587,714 A | 3/1952 | Embree et al. |
| 2,774,636 A | 12/1956 | Whitlock |
| 2,905,347 A | 9/1959 | Hopfeld |
| 3,951,462 A | 4/1976 | De Francisci |
| 4,029,364 A | 6/1977 | Salzer |
| 4,973,203 A | 11/1990 | Oftedal |

(Continued)

FOREIGN PATENT DOCUMENTS

| | | |
|---|---|---|
| DE | 3238245 | 4/1984 |
| DE | 19506538 A1 | 8/1996 |

(Continued)

OTHER PUBLICATIONS

Brochure for OKTOMAT by Helios, undated; Web pages from Helios Systems, Inc. where brochure was found. Web page copyrighted 2006.

(Continued)

*Primary Examiner* — William R Harp
(74) *Attorney, Agent, or Firm* — Charles N. Quinn; Fox Rothschild LLP

(57) ABSTRACT

This invention relates to a container emptying apparatus including a frame, a first and second tube, a suction tube, a motor, and a sweeper. The frame is adapted to be positioned over an opening of the container. The first tube is mounted on the frame and is in fluid communication with a vacuum source. The second tube is rotatably connected to the first tube and is also in fluid communication with the first tube. The sweeper assembly is connected to the second tube. The suction tube extends from the second tube such that, when the frame of this invention is placed over a container, the second tube, the suction flexible tube, and the associated sweeper assembly are lowered into the container and rotated by the motor such that, when the vacuum source is activated, the suction tube suctions the contents from the container.

20 Claims, 13 Drawing Sheets

(56) References Cited

U.S. PATENT DOCUMENTS

| | | |
|---|---|---|
| 5,379,814 A | 1/1995 | Posly |
| 5,382,117 A | 1/1995 | Rings et al. |
| 5,388,953 A | 2/1995 | Habicht |
| 5,489,182 A | 2/1996 | Habicht |
| 6,024,482 A | 2/2000 | Heyraud |
| 6,036,408 A | 3/2000 | Wilhelm et al. |
| 6,135,676 A | 10/2000 | Anderson |
| 6,409,274 B1 | 6/2002 | Merrett |
| 6,830,421 B1 | 12/2004 | Broderick |
| 7,591,709 B2 | 9/2009 | Shimizu et al. |

FOREIGN PATENT DOCUMENTS

| | | |
|---|---|---|
| DE | 19712177 | 9/1998 |
| EP | 371436 A1 | 6/1990 |
| EP | 1199266 B1 | 5/2004 |
| EP | 1580133 A2 | 9/2005 |
| SU | 1008122 | 3/1983 |

OTHER PUBLICATIONS

Brochure for Premier Ground Entry Gaylord Tilter Model 10-8500 from Ensign Equipment, Inc. dated Jul. 2009.

Brochure for Pneumatic Gaylord Tilter Model 10-5000 from Ensign Equipment, Inc. dated Jul. 2009.

Brochure for Gaylord Tilters 299 and 120 Series from The Conair Group, Inc., brochure is undated; Web page from The Conair Group, Inc. where brochure was found. Web page copyrighted 2000-2009.

Gaylord Tilter brochure from Mac Automation Concepts, Inc., brochure is undated; Web page from Mac Automation Concepts, Inc. where brochure was found. Web page copyrighted 2009.

Brochure for Air Operated Floor Level Gaylord Tilters from IMS Company, dated 2005.

Brochure for Hydraulic Gaylord Dumper from IMS Company, dated 2005.

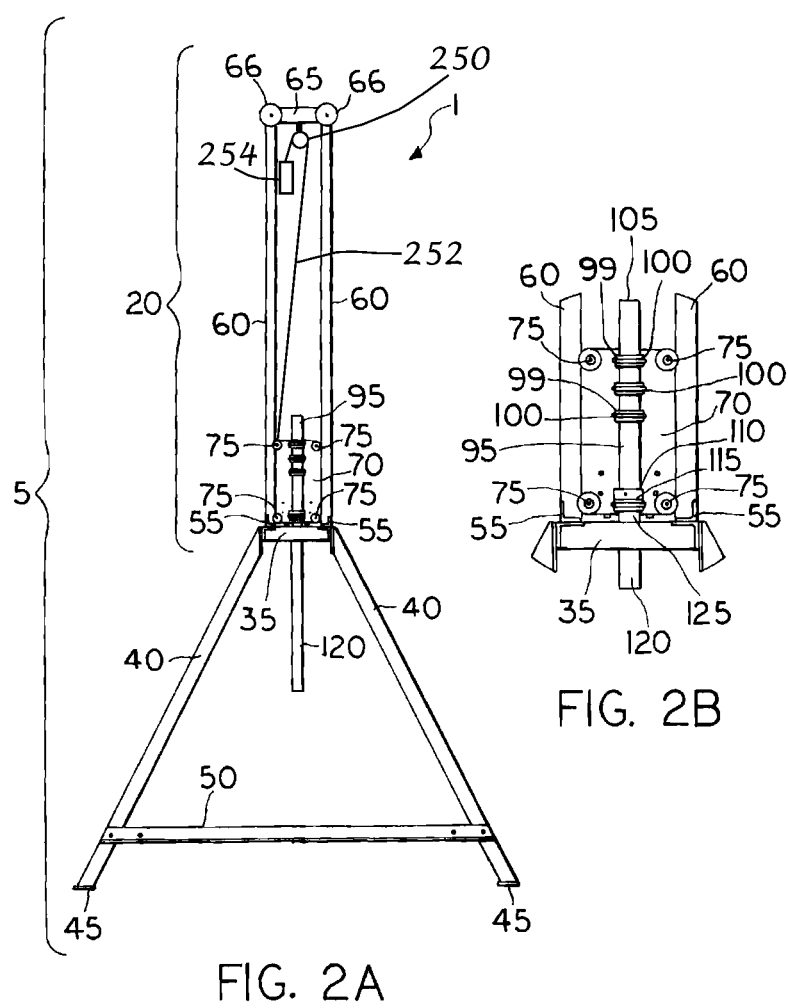

CONTAINER EMPTYING APPARATUS AND METHOD

CROSS-REFERENCE TO RELATED PATENT APPLICATION

This patent application is a continuation-in-part of U.S. Ser. No. 12/102,454 filed 14 Oct. 2008, now U.S. Pat. No. 8,104,997 issued 31 Jan. 2012. This application claims the benefit of the priority of Ser. No. 12/102,454, and the filing date thereof, under 35 USC 120. The disclosure of U.S. Ser. No. 12/102,454, now U.S. Pat. No. 8,104,997, is hereby incorporated by reference in its entirety.

FIELD OF THE INVENTION

This invention relates to apparatus and methods for unloading the contents of a container. More specifically, the invention relates to apparatus utilizing the suction force from a vacuum system to remove particulate material or bulk resin stored within a container having interior concave right angle corners without operator intervention.

BACKGROUND OF THE INVENTION

In many manufacturing operations, particularly with respect to plastic fabrication, it is not uncommon for some of the raw plastic resin materials, typically in pellet form, which are molded or extruded in the operation to be shipped to the manufacturing facility in heavy containers, e.g drums, barrels, Gaylords, Octobins, bulk trucks, rail cars, silo, day bins, flat bottom bins, or other utility bins that may or may not have a sloped bottom or flat bottom. Drums are typically fiber drums that are typically cylindrical, but can be other shapes as well, and usually hold between 200 to 250 lbs of material. Barrels can be the traditional barrels such as those made with staves of wood or other suitable material including metal and plastic. "Gaylords" are cubical corrugated containers, usually with a 1000 pound weight limit and are often made of cardboard material; however, they are not limited to this material and may be plastic. Octobins are similar.

Any of these containers may be delivered by any number of means to the manufacturing facility and are stored until they are required for use in the manufacturing process. The containers can be stored anywhere on the manufacturing site as desired and can be transported from the storage location by any suitable means such as by a fork lift, a conveyor belt, etc. Once the plastic resin pellets in the container are needed, the forklift or other device removes the container from the storage site and transports it to the location where the contents are needed. There, the container is either emptied all at once by dumping or only portions of the contents are manually removed from time to time, on an as needed basis. Typically these filled containers are too heavy to be lifted by a person and mechanical means are necessary to dump the contents, or workers use shovels and scoops to manually remove the material.

For particulate materials stored in such containers, such as plastic resin pellets, powders, and the like, vacuum or similar conveyance means can be used to remove the material from the container and transport the material through piping or tubing, or other similar means used in conveying material, to wherever the material is needed for manufacturing purposes. It is typical to use vacuum to empty these containers with a wand directly or indirectly coupled to a vacuum source. The wand is placed in the container and is either manually forced to the bottom by an operator or placed on the top of the contents of the container and allowed to suction its way to the bottom. The wand is stationary. Thus, it can only suction the contents of the container that are immediately around the wand. To this end, without operator assistance to re-position the wand, vacuum is inefficient to remove all of the particulate material and may leave as much as half the contents within the container. Accordingly, an operator must constantly monitor the wand and manually adjust it to ensure all of the material is removed from the container. This is costly in terms of labor and lost production.

One approach to this problem is addressed in European patent EP 1 199 266, disclosing a device and method for evacuating bulk material. Specifically, EP 1 199 266 teaches a suction apparatus that may be lowered into a sack-like container. The suction apparatus, once inserted into the sack, rests on top of the bulk resin contained therein and sinks as the resin is evacuated. The container is coupled to a lift which is adapted to raise and lower the sack. As the sack is raised, the diameter of the sack reduces, thereby forcing the resin toward the center of the container and allowing the suction to reach substantially all of the resin. In this approach, the container must be one that is easily manipulated. In other words, the approach is limited to a sack and does not provide a solution for evacuating resin from more rigid containers, e.g. drums, barrels, Gaylords, bulk trucks, rail cars, silos, day bins, flat bottom bins, or other utility bins.

Thus, there remains a need in the art for apparatus and methods for removing particulate material, particularly granular plastic resin pellets, powder, and the like, from a relatively rigid storage container and especially from rectangular, or cubical, or containers having concave angular interior corners, particularly right angle interior corners, without operator intervention or manipulation of the container.

SUMMARY OF THE INVENTION

This invention relates to a container emptying apparatus and methods of use of the same for unloading contents of a container, including containers with concave right angle interior corners. The invention utilizes the suction from a vacuum pump or vacuum system advantageously to remove particulate granular bulk resin pellets stored in a container. The material removed may be plastic resin, plastic pellets, powder, and any other similar granular or semi-granular substance stored in containers. The apparatus and method of the invention are applicable to any type of storage or transport container known in the plastics fabrication art such as Gaylords, Octobins, drums, barrels, bulk trucks, rail cars, silos, day bins, flat bottom bins or other utility bins which may have a sloped bottom or a flat bottom; the apparatus and methods of the invention are most preferably used to empty Gaylord containers.

In a preferred embodiment, the container emptying apparatus of the invention preferably comprises a frame, a first tube, a second tube and a flexible tube. More specifically, the frame of the apparatus preferably comprises a base platform including a front rail, a rear rail and two side rails, with the front rail and the rear rail preferably being coupled to the side rails to form a substantially preferably rectangular platform with an opening passing therethrough. The platform is preferably maintained above the ground by a plurality of legs with each leg extending from a corner of the rectangular platform. The legs may preferably be coupled together by a stabilizing bar.

Preferably extending upward from the base is an extension assembly. The extension assembly extends vertically from the platform and preferably comprises at least two (2) vertical risers each joined at one end to a horizontal rail. The other ends of the vertical risers are preferably coupled to the base such that the extension assembly straddles the opening in the platform.

A plate preferably is slidably mounted to the extension assembly. The plate is perpendicular to the base and may slide along the longitudinal axis of the extension assembly. A first tube is preferably coupled to the plate and is preferably also adapted to slide along the vertical risers of the extension assembly in unison with the plate. The first tube preferably is in fluid communication with a vacuum source and also preferably extends proximate to the opening of the base, when the plate is in its lowermost position.

The second tube is preferably rotatably connected to and in fluid communication with the first tube. The second tube preferably extends from the first tube through the opening of the base. The longitudinal axis of the second tube is preferably parallel with the first tube, preferably parallel with the longitudinal axis of the extension assembly, and preferably perpendicular to the base. At an end of the second tube, which is distal to the junction with the first tube, the second tube may be angled. Specifically, the distal end of the second tube is preferably at an angle of approximately 90 degrees to the proximate end of the second tube such that the distal end of the second tube is perpendicular to the longitudinal axis of a major portion of the second tube.

A suction tube is coupled to the second tube such that the suction tube is in fluid communication with the second tube. The suction tube is coupled to the distal end of the second tube such that the suction tube is concentric with the end of the second tube which is distal respecting the junction with the first tube. The suction tube is sized to extend from the second tube sufficiently to reach each side and corner of the targeted container in which granular plastic resin pellets to be removed reside.

A motor is coupled to the plate and is adapted to slide with the plate along the longitudinal axis of the extension assembly. The motor also engages the second tube, preferably by a pulley assembly, so as to cause the second tube to rotate in one direction repeatedly through 360 degrees. The second tube is preferably adapted to rotate continuously without rotational limitations. The motor preferably rotates both the second tube and the attached suction tube.

A sweeper assembly is coupled to the second tube. The sweeper assembly includes a sweeping element. The sweeper assembly preferably directs particulate material from the center of the container toward the periphery of the container as the second tube and suction tube rotate. The sweeper assembly desirably includes a brush.

In operation, the container emptying apparatus of the invention is preferably placed on substantially flat surface. The plate is lifted along the vertical risers of the extension assembly such that the plate is proximate to the horizontal rail. A container to be emptied is positioned beneath the base. Once the container is in position, the plate is lowered such that the suction tube and the second tube drop into the container and contact the container contents. An operator then activates the motor and the vacuum source. Alternatively, and preferably vacuum created by the activation of the vacuum source may close a switch activating the motor. The motor rotates the second tube and the suction tube continuously in one direction. While these tubes are rotating, the vacuum source draws as vacuum resulting in suction through the suction tube via the first and second tubes. As a result, the suction tube sucks the granular resin material in pellet form in and removes the resin from the container as the sweeper-suction assembly of the second tube and the suction tube rotates. As the suction tube rotates, the sweeper-suction assembly urges the granular plastic resin material in pellet form towards the periphery of the container. The suction tube is of sufficient length to reach and draw by vacuum material along the container periphery into the suction tube, removing substantially all of the granular plastic resin material in pellet form from the container.

BRIEF DESCRIPTION OF THE DRAWINGS

FIG. 2A is a left side elevation of the apparatus shown in FIG. 1.

FIG. 2B is an enlarged partial side elevation of the apparatus illustrated in FIGS. 1 and 2A, showing the connection of a first tube to the frame and connection of a second tube to the first tube.

DETAILED DESCRIPTION OF THE INVENTION

This invention relates to apparatus and methods for unloading containers. The invention utilizes suction from a vacuum pump or vacuum system to remove granular material, such as plastic resin pellets, from a container. The particulate material removed may also be powder or any other similar substance, that is stored in containers. The apparatus and method of the invention are applicable to any type of storage or transport container such as Gaylords, Octobins, drums, barrels, bulk trucks, rail cars, silo, day bins, flat bottom bins or other utility bins, which may have a sloped bottom or flat bottom; however, the apparatus and method of the invention have their greatest utility and applicability when used to empty Gaylord containers and other rectangular or cubical containers having concave right angle interior corners.

Figure 1:
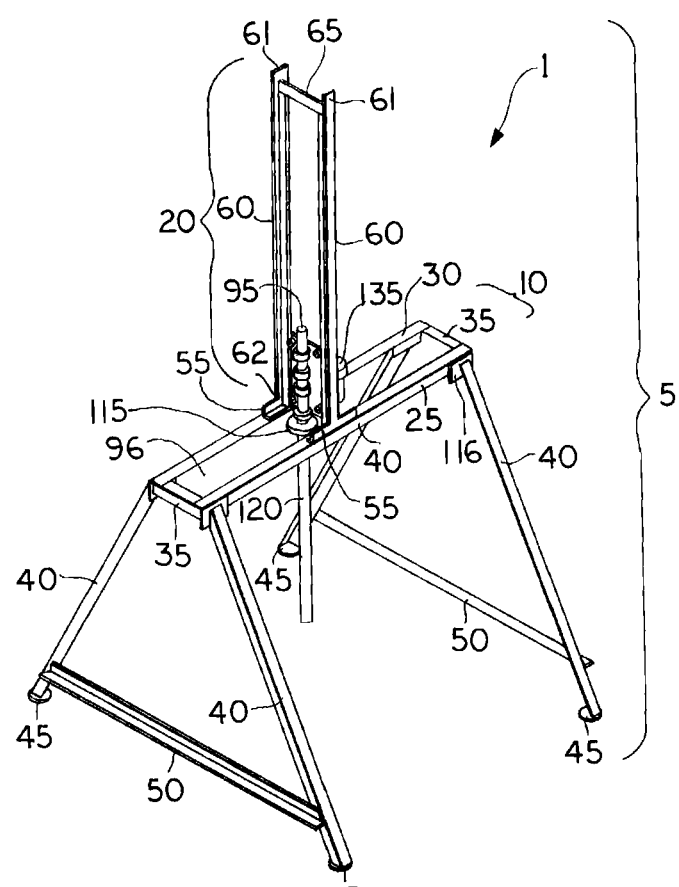
FIG. 1 is a schematic isometric view of a frame and other portions of container emptying apparatus embodying aspects of the invention.

Referring to FIG. 1, the container emptying apparatus 1 includes a frame 5 supporting a first tube 95, a second tube 120, which is coaxial and in communication with first tube 95 and a motor 135. Frame 5 includes a base platform 10, a plurality of legs 40 extending thereunder, and a riser assembly 20 supported by base platform 10. Base platform 10 includes similarly sized in cross-section front rail 25, rear rail 30, and two similarly sized side rails 35, all being connected so as to form a rectangular platform as shown. Rails 25, 30, and 35 are connected to form an opening 96, which is desirably rectangular in shape in the center of base platform 10.

Rails 25, 30, and 35 may be metal, plastic, wood, or any similar strong relatively rigid material and may be connected to one another by any method understood in the mechanical arts, e.g. nails and bolts, screws, glue, welding, etc. Preferably, rails 25, 30, and 35 are angle iron and are either welded together or bolted together so as to form a flush, flat upper surface of base platform 10.

It is desirable that base platform 10 be sized to extend entirely across the entire width of a container of interest. In other words, if the container is a Gaylord, a drum, a barrel, or some similar container, then the width of base platform 10, as determined by the lengths of front rail 25 and rear rail 30, should extend across and exceed the width of the Gaylord, or drum, or barrel, etc. Base platform 10 is not limited to the above structure or shape and may be any similar structure, shape or material capable of supporting other components of container emptying apparatus 1 as disclosed hereinbelow.

At both ends of base platform 10 are a plurality of legs 40. Preferably, container emptying apparatus 1 includes four (4) legs 40 with each leg 40 individually extending either from the junction of front rail 25 and one of side rails 35 or from the junction of rear rail 30 and one of side rails 35, such that one leg 40 extends from each of the four corners of base platform 10. Legs 40 may be metal, plastic, wood, or any similar material of sufficient strength and rigidity, and may be connected to the corners of base platform 10 by any method known in the mechanical arts, e.g. nuts and bolts, screws, glue, welding, etc., according to the material of legs 40.

Legs 40 may be coupled to corners of base platform 10 using an optional base mounting pad 116 with base mounting pad 116 being secured to base platform 10 by welding, bolts, glue, or the like. Optional base mounting pad 116 may be machined into a leg 25 or coupled to a leg 25 by any of the attachment mechanisms discussed herein. Legs 40 are preferably angle iron and are preferably bolted to the corners of base platform 10 through base mounting pad 116.

Legs 40 may extend perpendicularly from base platform 10, but, preferably, extend at approximately at 45 degree angle from base platform 10. More specifically, as illustrated in FIGS. 1 and 2A, legs 40 preferably extend from base platform 10 at an outward angle so as to provide additional support for base platform 10. In each of the foregoing embodiments, it is also desirable that legs 40 be sized such that they are longer than the sides or height of the targeted container. For example, if the container is a Gaylord, drum, barrel, or any of the above container types, then the legs extend from the ground such that base platform 10 may extend across the top and the width of the container. To this end, based on the width of the frame and height of the legs, frame 5 is adapted to straddle the targeted container.

At an end of each leg 40 is a foot 45 and, optionally, a foot pad (not illustrated). Each foot 45 is coupled to an end of each of each leg 40 that is distal to the junction of a leg 40 and base platform 10. Each foot 45 and foot pad serves to prevent frame 5 from sliding across the ground and to prevent frame 5 from damaging the surface on which it is placed.

Figures 3A, 3B:
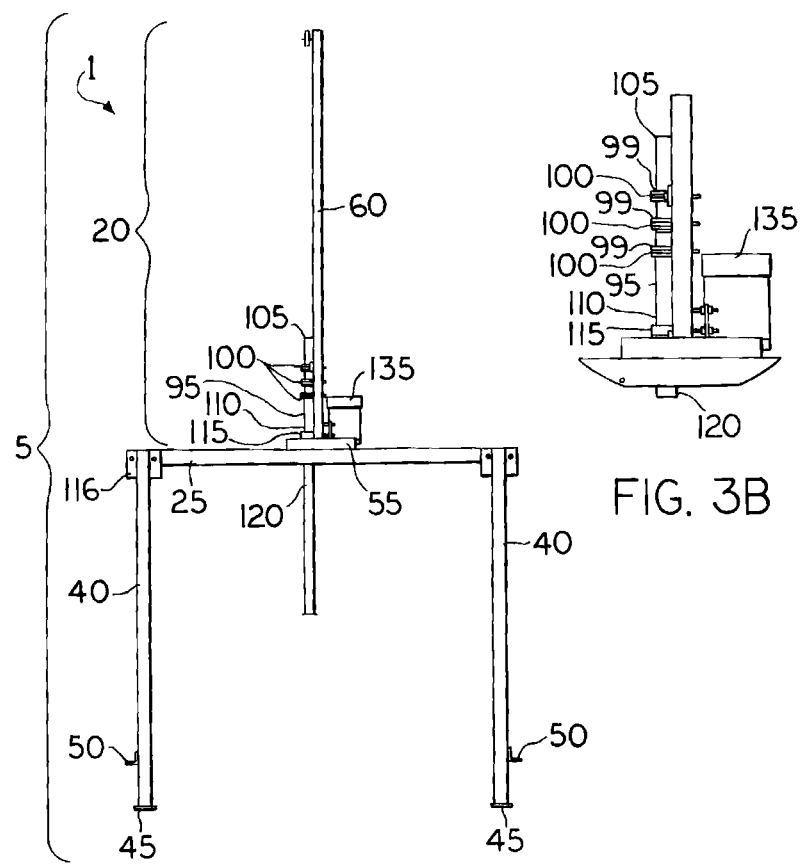
FIG. 3A is a front elevation of the apparatus illustrated in FIGS. 1, 2A and 2B.
FIG. 3B is an enlarged partial front elevation of the apparatus illustrated in FIGS. 1, 2A, 2B and 3A, showing connection of a first tube to the frame and a motor assembly.

Extending between each set of legs 40 at both ends of frame 5 are at least one stabilizing bar 50. More specifically, stabilizing bar(s) 50 couple two of the legs together so as to stabilize frame 5 and restrict the movement of the legs, especially during operation of the container emptying apparatus. Stabilizing bars 50 preferably extend parallel to one of side rails 35 and couple together the two legs extending from each corner of each respective side rail 35. Stabilizing bars 50 may metal, plastic, wood, or the like and may be coupled to legs 40 at any point along the length of the legs by any method understood in the art, e.g. bolts, glue, welding, etc. For example, in one embodiment stabilizing bars 50 are angle iron and stabilizing bars 50 are bolted to legs 40 such that they are parallel to the side rail 35 of base platform 10. As illustrated in FIG. 3A, it is desirable that stabilizing bars 50 not interfere with the ability of frame 5 to straddle the container, while still stabilizing legs 40 of frame 5. To this end, stabilizing bars 50 may be coupled to the legs on a side of the legs distal to the middle of the frame and may be proximate to the ends of legs 40 that are coupled to feet 45.

Referring again to FIG. 1, extending perpendicularly to and up from base platform 10 is an extension assembly 20. More specifically, extension assembly 20 is preferably comprised of two vertical risers 60 and a horizontal rail 65 supported by front rail 25 and rear rail 30 of base platform 10. To this end, extension assembly 20 substantially straddles opening 96 of base platform 10. Vertical risers 60 and horizontal rail 65 may be metal, plastic, wood, or the like and may be bolted, welded, glued, or affixed together by any other suitable means known in the art. Risers 60 and rail 65 are preferably angle iron and the rails are bolted together so as to form the structure disclosed herein. More specifically, a first end of 61 each vertical riser 60 is coupled to opposing ends of a horizontal rail 65 such that the resulting structure is substantially rectangular or square.

Coupled to the second ends 62 of each vertical riser 60 are base mounting brackets 55 which couple extension assembly 20 to base platform 10. Specifically, one end of a first vertical riser is coupled to the front rail of base platform 10 by a bracket 55 and one end of a second vertical riser is coupled to the rear rail of base platform 10, also by way of a bracket 55, such that the extension assembly straddles opening 96 in base platform 10. Brackets 55 may be metal, plastic, wood or the like, and may be coupled to vertical rails 60 by welding, glue, bolts, or any other suitable method understood in the art. Brackets 55 may, similarly, couple vertical rails 60 to base platform 10 by way of welding, glue, bolts, or any other similar method understood in the art.

In an alternative embodiment, brackets 55 may slideably engage base platform 10. To this end, brackets 55 may couple extension assembly 20 to base platform 10 such that extension assembly 20 can slide horizontally along base platform 10 in a direction parallel to front rail 25 and rear rail 30 and perpendicular to side rails 35. The mechanism for sliding engagement may be any such mechanism understood in the art such as, but not limited to, a track/wheel assembly, a ball bearing assembly, a pulley assembly or the like.

Figure 5:
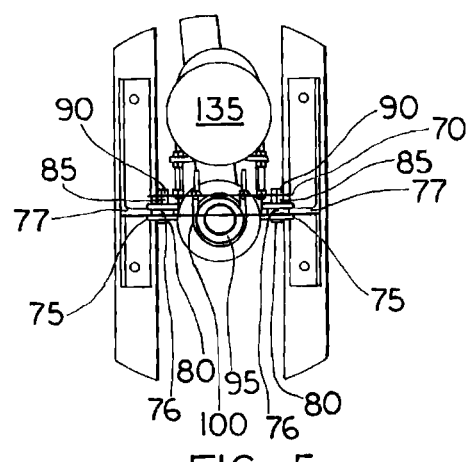
FIG. 5 is an enlarged top view of a motor, plate, and extension assembly as shown in FIG. 4.
Figure 6:
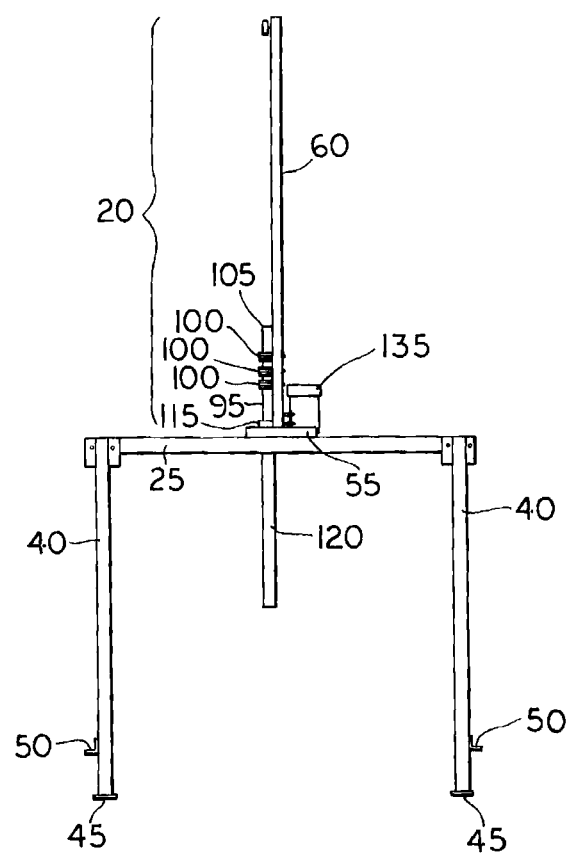
FIG. 6 is a front elevation of an alternate embodiment of a frame and other portions of container emptying apparatus, manifesting aspects of the invention.

Referring to FIGS. 2A and 2B, parallel to and in a sliding engagement with vertical risers 60 is a motor mounting plate 70, which may be metal, plastic, wood, etc. and is of width approximately the distance between two vertical risers 60. Referring to FIGS. 2B and 5, plate 70 slideably engages extension assembly 20. To this end, in one embodiment, plate 70 may be coupled to a plurality of grooved wheels 75 wherein the grooves 76 of wheels 75 are adapted to overlap and engage corresponding tracks 77 on vertical risers 60. As such, plate 70 is adapted to slide up and down vertical risers 60 of extension assembly 20, utilizing the wheel/track assembly, wherein horizontal rail 65 defines the upper limit of movement of plate 70 and the base/extension assembly junction defines the lower limit of movement of plate 70. As illustrated in FIG. 5, plate 70 may be secured to wheels 75 by a bolt 80, a locknut 85, and a nut 90, such that plate 70 is secured to bolt 80 without interfering with the movement of wheels 75 along vertical risers 60. The invention, however, is not limited to this embodiment and the wheels, or any functionally similar mechanism, may be secured to plate 70 by any similar attachment means.

In one embodiment, plate 70 may be raised and lowered along extension assembly 20 by a pulley system. Referring to FIG. 2A, one or more pulley wheels 66 may be secured to extension assembly 20, preferably along horizontal rail 65. Pulley wheels 66 engage plate 70 by way of a rope, wire, or the like such that the action of the rope/wire/etc. passing along pulley wheels 66 raises and lowers plate 70 along extension assembly 20 between the plate uppermost and lowermost positions. To this end, the pulley system may be adapted to lock the plate in a specific position. Alternatively, the pulley system may be adapted to raise or lower the plate depending upon the level of resin within the targeted container and/or the desired position of the tubes of the container emptying apparatus. The invention, however, is not limited to the pulley system. Rather, any similar mechanism, whether manual or automatic, may be utilized to facilitate the raising and lowering of plate 70 along extension assembly 20.

In a further embodiment, either independently or in conjunction with the above pulley system, a counterforce may be applied to the plate. More specifically, in one embodiment a spring loaded cable may be secured to the plate and the frame, preferably by way of the extension assembly, such that the spring loaded cable provides a lift force slightly lower than the weight of the plate. Moreover, the spring loaded cable provides a lift force to compensate for the weight of the plate, motor, and plurality of tubes affixed thereto such that the net downward force of the weight of the these items is substantially reduced and less force is applied to the granular material, as discussed further herein. The application of the counterforce is not limited to a spring loaded cable but may be in a constant force spring, a counterweight system, or the like.

The counterforce is most preferably applied to plate 70 as a counterbalance by a pulley-cable system and a counterweight. A counterbalance pulley 250 is preferably connect to horizontal rail 65 as shown in FIG. 2A. A counterbalance cable 252 is connected at one end to plate 70, passes around pulley 250, and is connected at the remaining end to counterweight 254. Counterweight 254 is preferably furnished in the form of a set of circular disk-like plates having slots therein to receive and fit around cable 252, which plates rest on a disk-like support to which cable 252 is secured. Having counterweight 254 in the form of a set of disk-like plates allows the counterforce to be adjusted, which is desirable to optimize operation of container emptying apparatus 1 for a wide variety of granular materials, of greatly varying density, particle size, roughness, and the like.

Coupled to one side of plate 70 is a first tube 95, which is a hollow cylindrical tube made of metal, plastic, etc. It is desirable that the first tube 95 be aluminum, however, this invention is not limited to this. Regardless of its material, first tube 95 is coupled to plate 70 such that first tube 95 is adapted to slide up and down vertical risers 60 of extension assembly 20 in conjunction with plate 70. As illustrated in FIGS. 3B and 5, first tube 95 may be secured to plate 70 by a plurality of U-bolts 100 and nuts spaced along the longitudinal axis of the plate 70 and centered thereon. The U-bolts 100 may correspond with a plurality of grooves (not illustrated) in the first tube 95 such that, when secured to plate 70, U-bolts 100 rigidly hold first tube 95 in position against plate 70. Alternatively, a plurality of annular bushings 99 may be spaced between U-bolts 100 and first tube 95 where bushings 99 reduce frictional damage or wear by U-bolts 100 on first tube 95, while still allowing the U-bolts 100 to frictionally hold first tube 95 to plate 70. The invention, however, is not limited to this structure and first tube 95 may be coupled to plate 70 by any suitable mechanism understood in the art.

Figure 8A:
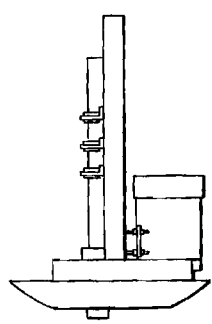
FIG. 8A is an enlarged front view of an alternate coupling of a first tube to a frame of container emptying apparatus manifesting aspect of the invention.
Figure 8B:
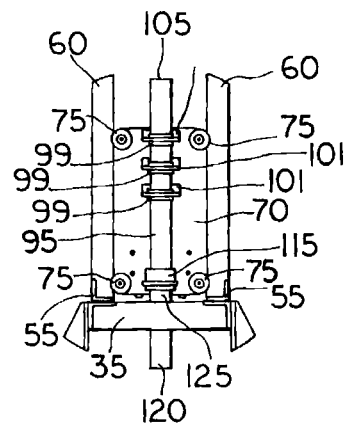
FIG. 8B is an enlarged side view of the alternate coupling of a first tube to a frame of container emptying apparatus manifesting aspects of the invention.
Figure 8C:
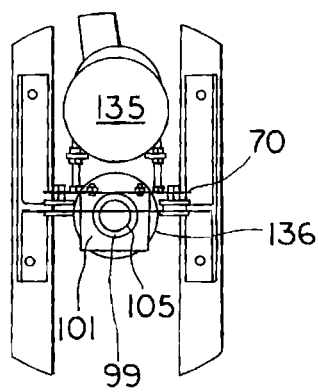
FIG. 8C is an enlarged top view of the alternate coupling of a first tube to a frame of container emptying apparatus manifesting aspects of the invention.

For example, referring to FIGS. 8A, 8B, and 8C in an alternative embodiment, rather than U-bolts, first tube 95 may be secured to plate 70 by one or more brackets. In one embodiment, the bracket is an L-bracket 101 made of steel, or other similar material. One side of the L-bracket may have a hole passing therethrough wherein the hole is size to receive first tube 95 and, optionally, a bushing 99. First tube 95 and bushing 99 may be inserted into the hole of L-bracket 101 such that L-bracket 101 and bushing 99 secure first tube 95 therein. As illustrated in FIG. 8C, the side of L-bracket 101 without the hole may be coupled to plate 70. In a preferred embodiment, L-bracket 101 is secured to plate 70 by one or more nut/bolt combinations; however, this invention is not so limited and may include any method known in the art to couple a metal bracket to a metal plate. Based on the foregoing, and as illustrated in FIGS. 8A, 8B, and 8C, a plurality of brackets may be secured along the longitudinal axis of first tube 95.

Figure 11A:
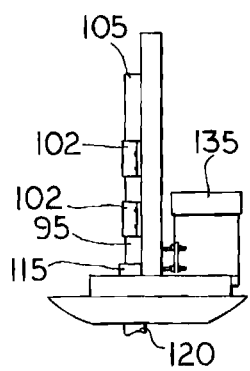
FIG. 11A is an enlarged front view of a third alternate coupling of a first tube to a frame of container emptying apparatus manifesting aspects of the invention.
Figure 11B:
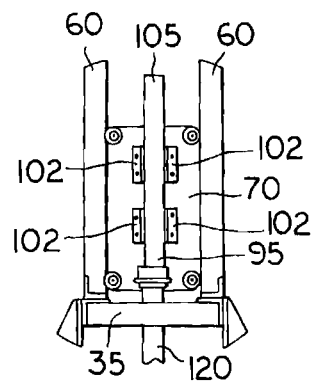
FIG. 11B is an enlarged side view of the third alternate coupling of a first tube to a frame of container emptying apparatus assembly manifesting aspects of the invention.

In an alternative embodiment, referring to FIGS. 11A and 11B, the L-brackets may be completely solid and coupled to the sides of first tube 95. Specifically, as illustrated in FIG. 11B, two solid L-brackets 102 may be secured to opposing sides of first tube 95 wherein each L-bracket 102 is coupled to its respective side of first tube 95 and to plate 70. In a preferred embodiment, each L-bracket 102 may be welded to the side of first tube 95 and secured to plate 70 by a plurality of nuts and bolts.

Figure 9A:
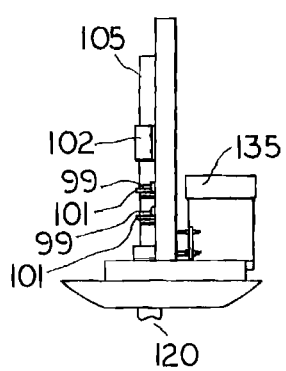
FIG. 9A is an enlarged front view of a second alternate coupling of a first tube to a frame of container emptying apparatus manifesting aspects of the invention.
Figure 9B:
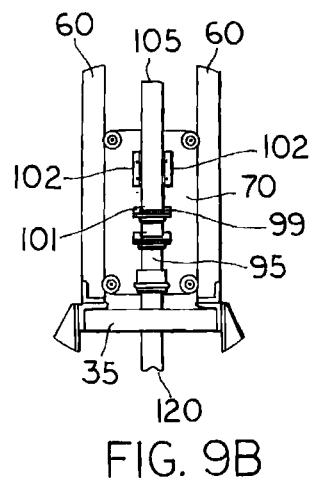
FIG. 9B is an enlarged side view of the second alternate coupling of a first tube to a frame of container emptying apparatus manifesting aspects of the invention.

This invention is also not limited to the foregoing methods of coupling first tube 95 to plate 70 and may include any combination of the foregoing methods, or similar methods, of securing first tube 95 to plate 70. In the most preferred embodiment, as illustrated in FIGS. 9A and 9B, first tube 95 is secured to plate 70 using both types of L-brackets 101, 102. Specifically, the uppermost L-bracket 101 may be a set of solid L-brackets 102 secured to opposing sides of first tube 95 wherein each L-bracket 102 is welded to first tube 95 and coupled to plate 70 by way of nuts and bolts. Beneath the set of solid L-brackets 102 and substantially centered on plate 70 is a first L-bracket 101 with a hole passing therethrough. In accordance with the foregoing, first L-bracket 101 and bushing 99 may be secured to first tube 95 and to plate 70 so as to provide a second means of securing first tube 95 to plate 70. Finally, beneath first L-bracket 101 is a second L-bracket 101 with a hole passing therethrough. Much like first L-bracket 101 and bushing 99, second L-bracket 101 and bushing 99 are secured to first tube 95 and to plate 70 in accordance with the above, so as to provide a third means for securing first tube 95 to plate 70. This most preferred embodiment, however, is not intended to be limited to the structure of this invention and the invention may also include any of the foregoing coupling means, or similar coupling means, in any number or size so as to secure first tube 95 to plate 70.

Referring to FIGS. 3A and 3B, the first tube 95 is preferably secured to plate 70 such that first tube 95 is desirably substantially centered between vertical risers 60 of extension assembly 20. First tube 95 is thereby vertically positioned with its longitudinal axis perpendicular to base platform 10. In one embodiment, a first end 105 of first tube 95 extends above plate 70, as illustrated in FIGS. 1 and 2A, and is adapted to receive a vacuum source (not illustrated).

In practice, the vacuum source is normally remote from the apparatus of the invention and is removably coupled to first end 105 of first tube 95 by a vacuum receiver. The vacuum receiver may be a tube (not illustrated) sized to fit over first end 105 of first tube 95 and may be coupled thereto by any suitable coupling mechanism. The tube may be comprised of a synthetic polymer, plastic, or vinyl, although not limited thereto, and the coupling mechanism may be a clamp, most preferably a screw clamp. However, the coupling mechanism is not limited to a clamp and the vacuum receiver may be coupled by way of a threading engagement, snap fit, a retention ring, bolts, or any similar mechanism known in the art such that the hollow interior of first tube 95 is placed into fluid communication with the vacuum source.

From first end 105, first tube 95 extends downwardly substantially parallel to plate 70 and proximate to opening 96 in base platform 10 to a second end 110. A retaining ring 115 is coupled to second end 110 of first tube 95 by way of a retaining pin, bolt, screw or the like. In a further embodiment, the retaining ring 115 may also receive a U-bolt or bracket so as to further secure first tube 95 to plate 70.

Retaining ring 115 is adapted to receive a second tube 120 so as to keep first tube 95 and second tube 120 into fluid communication with each other. Similarly to first tube 95, second tube 120 is a rigid hollow cylindrical tube of any suitable material such as metal, plastic, etc. In one preferred embodiment, second tube 120 may be aluminum; however, the invention is not limited to this. A first end 125 of second tube 120 may be grooved (not illustrated) and adapted to be received by retaining ring 115 on the first tube 95. A segment at the second end (illustrated in FIGS. 10, 12 and 14) of second tube 120 may be straight, but is preferably an elbow 176 bent at approximately 90 degrees relative to the longitudinal axis of the second tube 120 and is adapted to receive a suction tube 208, discussed below.

First end 125 of second tube 120 is secured to first tube 95 by way of retaining ring 115 such that second tube 120 is in fluid communication with first tube 95 and is able to rotate about its longitudinal axis. Specifically, in one embodiment, retaining ring 115 may be removably engaged with second tube 120 by way of a ball bearing assembly. As such, a plurality of ball bearings within an interior groove of retaining ring 115 may correspond with a groove at first end 125 of second tube 120. First tube 95 may be coupled to plate 70 such that first tube 95 is relatively immovable, while second tube 120 is rotatably mounted to first tube 96 such that second tube 120 may rotate 360 degrees about the common longitudinal axis of the first and second tubes 95, 120.

Retaining ring 115 may optionally provide an additional advantage in contributing to the vacuum flow within first tube 95. Specifically, first and second tubes 95, 120 are retained and may be optionally connected to one another by way of retaining ring 115 such that tubes 95, 120 are adjacent to each other, but with a slight gap therebetween. To this end, when the vacuum source is in operation, air from outside the tubes is optionally allowed to flow into the gap between first tube 95 and second tube 120 and into the fluid stream drawn by the vacuum source. Under some conditions, this optional additional air contributes to the overall fluid stream and facilitates the ability of the vacuum source to suction resin from a container 202.

When secured to retaining ring 115, second tube 120 extends vertically and downwardly from base platform 10 towards an interior of frame 5 such that the second end of second tube 120 is substantially between all four legs 40 of frame 5. To this end, when frame 5 is straddling a container 202, second tube 120 extends from base platform 10 above the container down into an interior of a container 202. How far the second tube 120 extends into container 202 depends on location of plate 70 on vertical risers 60. For example, if plate 70 is positioned on vertical risers 60 at an uppermost position, i.e. near horizontal rail 65, then the second end of second tube 120 would be proximate to base platform 10 and the top of container 202 thereunder. Conversely, if plate 70 is positioned on vertical risers 60 at the lowermost position, i.e. near base platform 10, then the second end of second tube 120 would be proximate the bottom of container 202 or the ground, as illustrated in FIG. 3A. The second tube 120 is, thereby, adapted to extend the entire height of container 202 such that the second end of second tube 120 may be placed at any position along the height of container 202.

Figure 15:
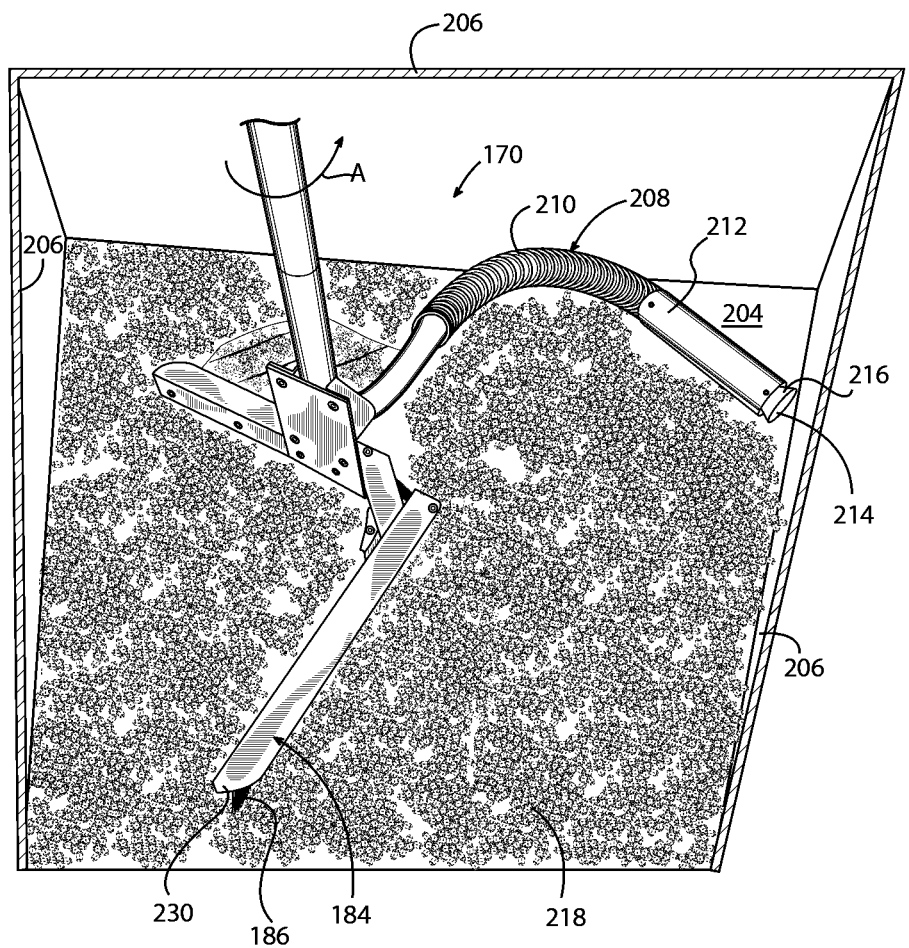
FIG. 15 is an isometric view of the sweeper-suction assembly illustrated in FIGS. 10, 12, 13 and 14 in a rectangular container, a portion of which has been broken away, with the assembly in operation removing granular resin material from the container.

Coupled to and extending from an elbow section at the second end of second tube 120 is a suction tube 208 with a fitting 216 on the open end. Suction tube 208 fits with the second end of second tube 120. The second end portion 176 of second tube 120 is an elbow and suction tube 208 fits over the outlet of elbow 176, as illustrated in FIG. 15. Due to the presence of elbow portion 176 of second tube 120, suction tube 208 is adapted to extend perpendicularly from the axis of first tube 95. Suction tube 208 is of sufficient length where extending from second tube 120 so as to reach each side and corner of the targeted container from which resin is to be removed.

Suction tube 208 may be coupled to second tube 120 by a coupling mechanism such as a clamp, most preferably a screw clamp. However, the coupling mechanism is not limited to a clamp and may be threaded engagement, snap fit, a retention ring, bolts, or any similar mechanism or frictional engagement known in the art such that the open interior of suction tube 208 is placed into fluid communication with second tube 120. With this arrangement, suction tube 208 is in fluid communication with the vacuum source. Suction tube 208 provides a smooth flow path for air entrained particulate material, i.e. the contents of container 202, such that the contents may be suctioned or removed from container 202 and deposited in a secondary location for further processing such as molding or extrusion. Suction tube 208 is of length sufficient to reach any corner and or side of container 202 when coupled to second tube 120 in accordance with the above. For example, if frame 5 straddles container 202 and second tube 120 is lowered into the interior of the container, suction tube 208 is of sufficient length to reach each co-planar corner and side of container 202. As second tube 120 is rotated, suction tube 208 thereby extends to any co-planar location within the container.

Suction tube 208 may be a polymeric or co-polymeric material adapted to withstand the negative pressure generated by the vacuum source and the shear forces experienced by suction tube 208 as suction tube 208 rotates and contacts the upper surface of the granular resin or other material in container 202. Suction tube 208 may also a synthetic polymer, e.g. vinyl. The synthetic polymer may be cured such that suction tube 208 contains one or more ridges arranged about the periphery of suction tube 208. The ridges may be arranged concentrically about the diameter of suction tube 208 such that each ridge is substantially perpendicular to the longitudinal axis of suction tube 208. Alternatively, in a more preferred embodiment, the ridges may extend at an angle, with respect to the longitudinal axis of the tube, such that the ridges form a spiral design about the other periphery of suction tube 208. In an even further alternative embodiment, the ridges may be reinforced with steel or other metallic wire so as to maintain suction tube 208 open while the vacuum source is drawing vacuum.

At an end of suction tube 208 distal relative to second tube 120 is a fitting 212. As illustrated in FIG. 5, fitting 208 is cylindrical in shape and is preferably a light-weight material such as, but not limited to, aluminum, plastic, etc. Fitting 212 is of a relatively uniform diameter and is adapted to be fitted around suction tube 208 or may be attached as an extension portion of suction tube 208. Fitting 208 may be secured to the end or about suction tube 208 by any means understood in the art. For example, fitting 212 may be secured to suction tube 208 by a clamp, strap, or other frictional means. Alternatively, fitting 212 may be bonded or glued to suction tube 208 by any bonding agent, e.g. epoxy, known in the art.

As noted above, second tube 120 and suction tube 208 are rotatable about the longitudinal axis of the second tube 120 by motor 135. More specifically, referring to FIGS. 3A and 3B, motor 135 is coupled to plate 70 proximate the junction of first tube 95 and second tube 120. Motor 135 may be mounted to plate 70 on a side of the plate opposing first tube 95 or in any other location on plate 70 such that motor 135 does not interfere with the junction of first tube 95 and second tube 120 and/or interfere with rotation of the second tube 120. Motor 135 may be mounted to plate 70 using a plurality of bolts and nuts or any other suitable securing mechanism known in the art. Motor 135 is preferably secured to plate 70 using a casing wherein the casing is directly or indirectly coupled to plate 70 so as not to interfere with the action of motor 135.

Figure 4:
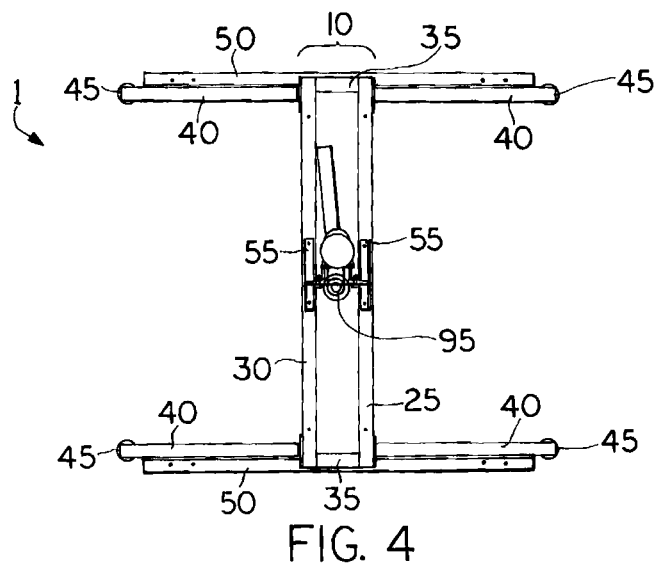
FIG. 4 is a top view of the apparatus illustrated in FIGS. 1, 2A and 3A.

As illustrated in FIGS. 4 and 5, motor 135 may be secured to plate 70 by using a casing wherein the casing is circular in shape and contains a plurality of brackets, which may be coupled to plate 70. However, the invention is not limited to the casing illustrated in these figures and may utilize any suitable apparatus or structure known in the art for coupling a motor to a frame.

Figure 7:
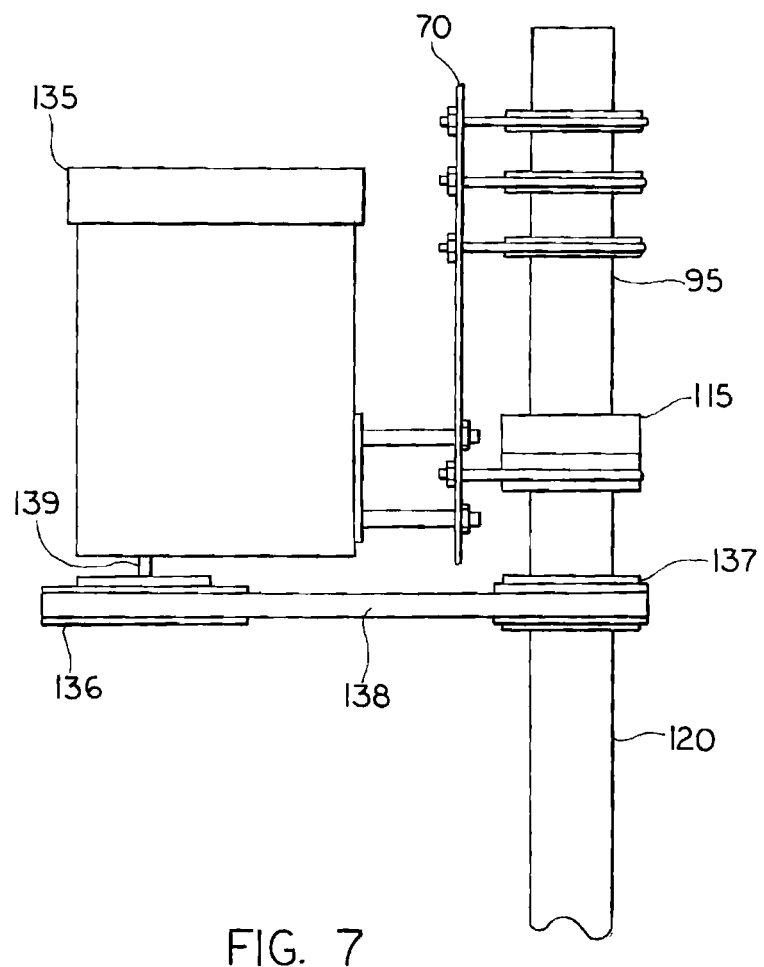
FIG. 7 is an enlarged broken side elevation of apparatus illustrated in FIG. 6 with the frame removed to illustrate connection between a motor and a vacuum tube with a plate.

Referring to FIG. 7, motor 135 is adapted to facilitate rotation of second tube 120 about its longitudinal axis by way of a pulley assembly. More specifically, a rotatable shaft 139 extends from motor 135 and the motor casing such that one end of shaft 139 is exposed. Shaft 139 may be rotated by the motor in either a clockwise or counterclockwise direction. Coupled to the exposed end of shaft 139 is a first annular pulley wheel 136. First pulley wheel 136 is secured to shaft 139 such that pulley wheel 136 rotates in unison with shaft 139 and may be fixedly coupled to the shaft or removably coupled thereto. In one embodiment, first pulley wheel 136 is coupled to shaft 139 such that pulley wheel 136 is substantially beneath plate 70. An annular groove or recess (not illustrated) may extend about the periphery of first pulley wheel 136 wherein the annular groove or recess receives a rope, belt, wire, or similar known mechanism in accordance with the below.

Coplanar with first pulley wheel 136 and coupled to second tube 120 is a second, annular, pulley wheel 137. Second pulley wheel 137 is secured to second tube 120 such that second pulley wheel 137 rotates in unison with second tube 120 and may be fixedly coupled to second tube 120 or removably coupled thereto. In one embodiment, second pulley wheel 137 is coupled to second tube 120 such that pulley wheel 137 is substantially beneath plate 70. An annular groove or recess (not illustrated) may extend about the periphery of second pulley wheel 137 wherein the annular groove or recess receives a rope, belt, wire, or similar known mechanism in accordance with the below.

As illustrated in FIG. 7, first pulley wheel 136 and second pulley wheel 137 are adapted to rotate in unison by way of a belt, rope, wire etc 138. More specifically, the belt, rope, wire, etc. 138 is received within the annular grooves of both pulley wheels 136, 137 such that the motion of one wheel is transferred to the other wheel. To this end, rotation of shaft 139, driven by motor 135, rotates the first pulley wheel 136. This motion is transferred to second pulley wheel 137 by the belt, rope, etc. 138, thereby causing second tube 120 to rotate.

Motor 135 may be any small motor known in the art as able to rotate a shaft in accordance with the above. In one embodiment, the motor of this invention may be comprised of an AC Gearmotor of $\frac{1}{10}$ hp that operates to rotate second tube 120 and sweeper-suction assembly 170 at approximately one revolution per minute. However, the invention is not limited to a motor of these specifications and may use a similar motor that is fairly lightweight, such that the weight of the motor does not hinder the operation of the apparatus disclosed herein and turns second tube 120 and sweeper-suction assembly 170 at a sufficient rate to adequately suction the contents of container 202.

Figure 10:
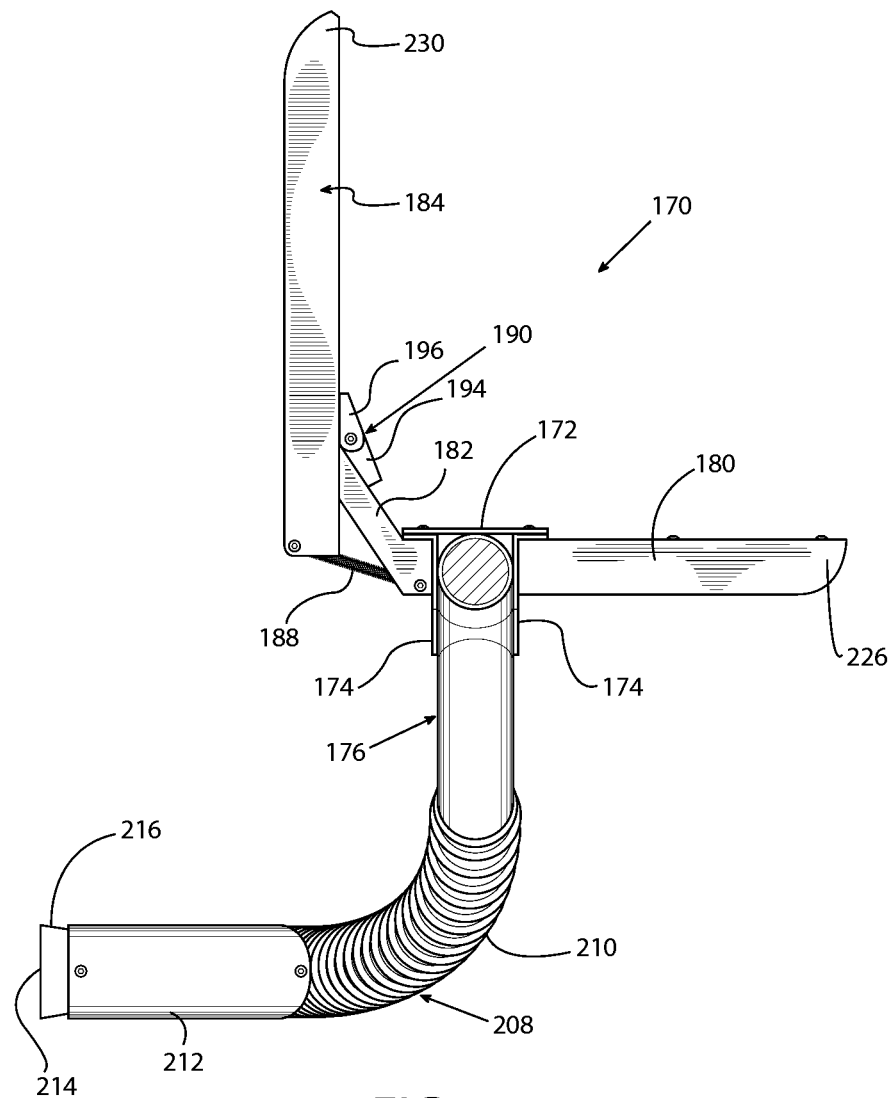
FIG. 10 is a top view of an enlarged view of a sweeper-suction assembly portion of container emptying apparatus manifesting aspects of the invention.
Figure 12:
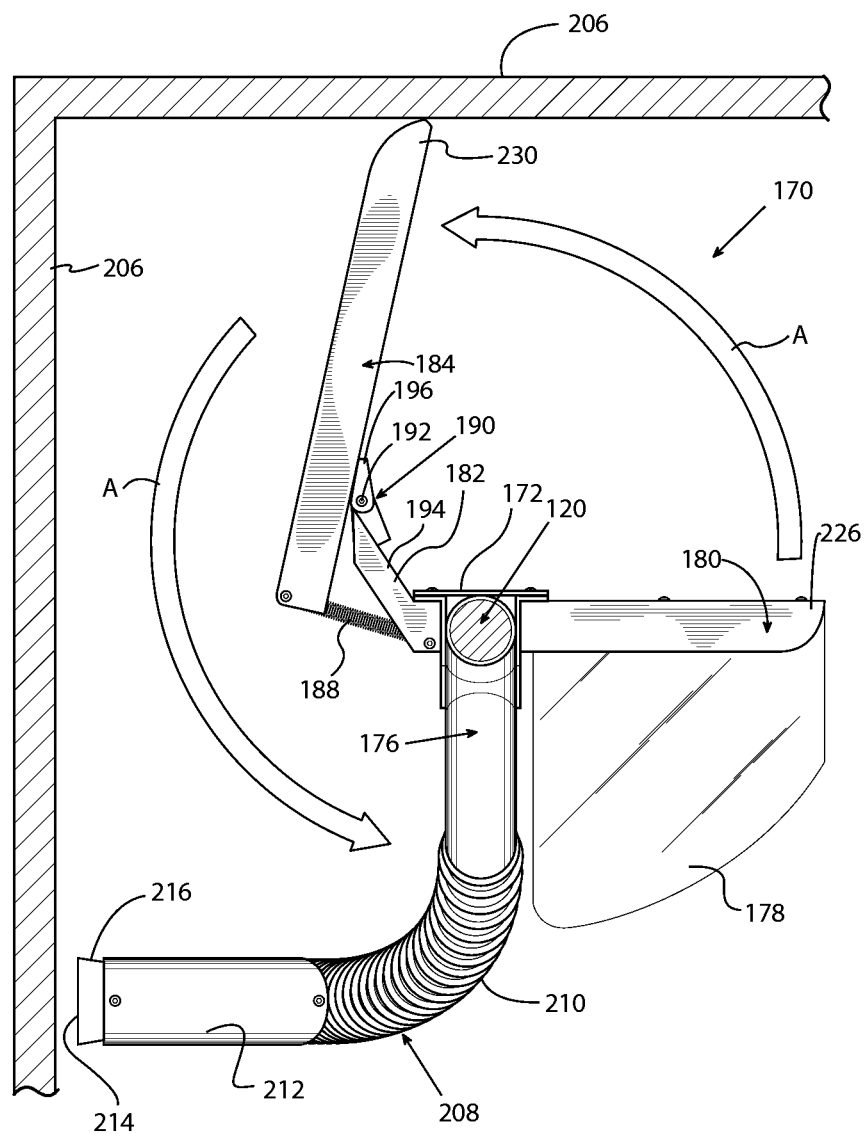
FIG. 12 is a top view of the sweeper-suction assembly illustrated in FIG. 10 in position within a container to be emptied, showing the direction of rotation during operation and depicting a portion of the assembly encountering the interior wall surface of the container being emptied.
Figure 13:
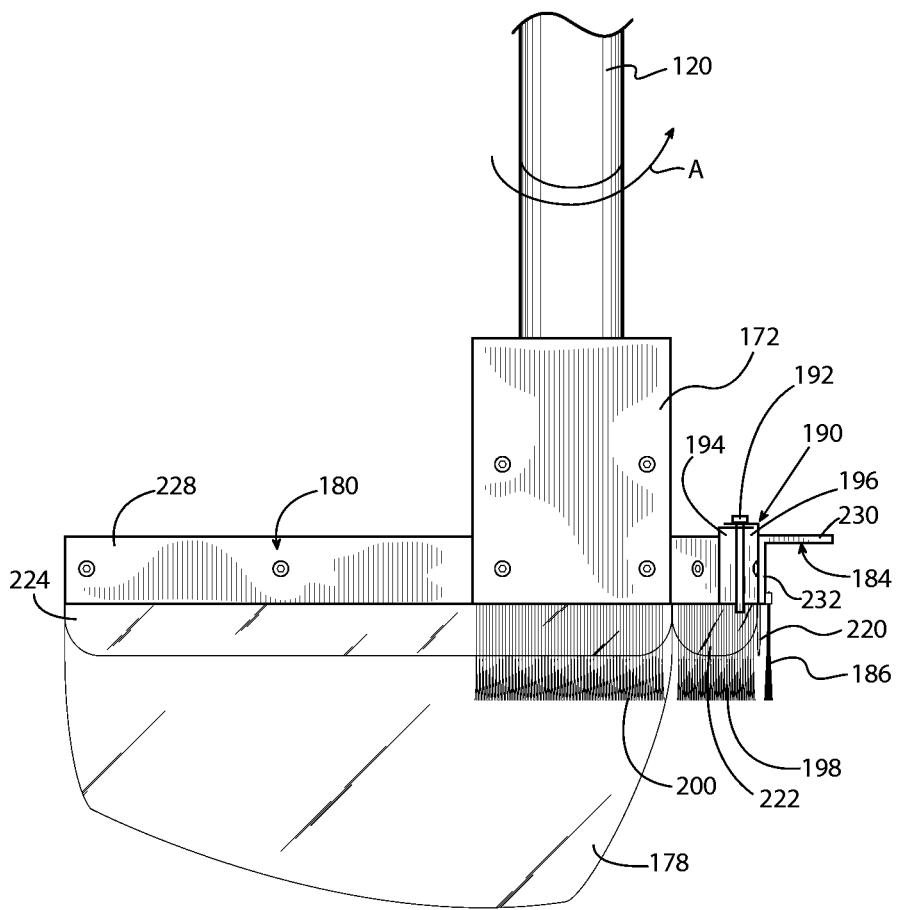
FIG. 13 is a side elevation of the sweeper-suction assembly illustrated in FIG. 10, looking from the top towards the bottom in FIG. 10.
Figure 14:
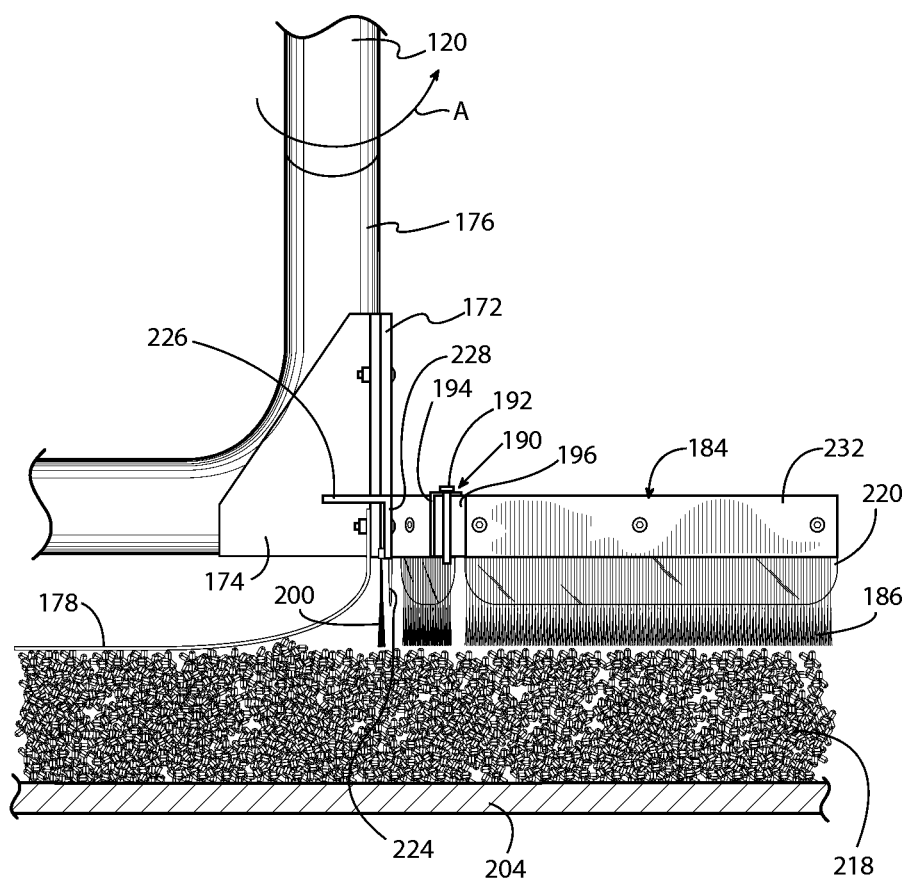
FIG. 14 is a broken side elevation of the sweeper-suction assembly illustrated in FIGS. 10, 12 and 13, in position within a container to be emptied, looking from right to left in FIG. 13, showing the effect of a sled and brushes on granular material to be removed from the container.

The sweeper-suction assembly portion of the apparatus of the invention is designated generally 170 and illustrated in FIGS. 10, 12, 13, 14 and 15. Sweeper-suction assembly 170 is attached to an elbow section 176 of second tube 120 with elbow section 176 transitioning the end of second tube 120 from a vertical orientation to a horizontal orientation, as shown in FIG. 14. Affixed to the exterior of elbow section 176 is a first plate 172 and two second plates 174, with second plates 174 being affixed on either side of elbow section 176 and oriented perpendicularly to first plate 172. The arrangement of first and second plates 172, 174 about elbow section 176 is illustrated in FIGS. 10 and 12. First and second plates 172, 174 are secured together preferably by screws and nuts; adhesive could also be used, or the plates could be welded together.

The assembly consisting of first plate 172 and second plates 174 is secured to elbow section of 176 of second tube 120, preferably by welding, or by adhesive, or by mechanical screws and nuts. The manner of attachment depends on the choice made for the material of elbow section 176 of second tube 120. Typically, second tube 120 and elbow section 176 are aluminum or steel, with thin wall diameter such that self-tapping screws may be used to secure first and second plates 172, 174 to elbow section 176 of second tube 120. So long as the screw connection is relatively firm or if rubber washers or sealants are used, sufficient air tightness is achieved that there is no substantial air leakage into second tube 120 when vacuum is drawn therein and the suction or vacuum material drawing function of suction tube 208, described below, is not compromised.

Extending horizontally from connection with one of second plates 174 is a sled mounting arm 180, which is preferably formed from angle iron or other right angle structure as illustrated in FIGS. 14 and 15. Sled mounting arm 180 has a horizontal portion 226 and a vertical portion 228 as illustrated respectively in FIGS. 10 and 13. A sled 178 is connected to and extends downwardly from sled mounting arm vertical portion 228 as illustrated in FIGS. 13 and 14. Sled 178 is preferably flexible or bendable plastic, mot preferably polycarbonate sold under the trademark "Lexan". Sled 178 hangs vertically from sled mounting arm vertical portion 228 when sweeper-suction assembly 170 is raised above the level of plastic resin pellets in the Gaylord or Octobin container 202 to be emptied.

In operation, sweeper-suction assembly 170 is lowered into position contacting the upper surface of the mass of plastic resin pellets to be removed from Gaylord container 202. As sweeper-suction assembly 170 begins to rotate, sled 178 deforms by bending into the position illustrated in FIG. 14 and thereafter rides on the upper surface of pellets 218 as rotation of sweeper-suction assembly 170 continues. As sled 178 is dragged along the upper service of pellets 218, the smoothing action effectuated by sled 178 contacting the upper service of pellets 218 and the resulting frictional force on sled 178 as well as the resistance to downward force supplied by the granular material prevents sweeper-suction assembly 170 from digging into the pile of granular material to an extent that sweeper-suction assembly 170 might be choked and rendered inoperative as respective removal of granular material 218 from container 202.

Also secured to sled mounting arm vertical portion 228 is a plate brush shield 224 preferably formed of relatively rigid, preferably transparent, plastic. Plate brush shield 224 overlies the upper portion of a plate brush 200, as illustrated in FIG. 13 and as further depicted in FIG. 14. Plate brush shield 224 serves to partially breakdown and to some extent flatten small piles or lumps of granular plastic resin or other materials that plate brush 200 might otherwise encounter. Such small piles or lumps of granular material could foul plate brush 200 and render it less effective.

A transition arm 182 is also connected to first plate 172 and the one of second plates 174 to which sled mounting arm 180 is not connected. As a result transition arm 182 is positioned on the opposite side of elbow section 176 of second tube 120 with respect to sled mounting arm 180.

Similarly to sled mounting arm 180, transition arm 182 is preferably formed of angle iron and is secured to first plate 172 and preferably to the proximate one of second plates 174 by mechanical means, preferably by sheet metal screws and nut-bolt combinations, as illustrated to some extent but not numbered in the drawings. Transition arm 182 extends angularly outwardly away from juncture with first plate 172 and second plate 174 at approximately forty-five degree (45°) angle relative to second tube 120 as illustrated generally in FIGS. 10 and 12. Use of sheet metal screws and nut-bolt combinations to secure transition arm 182 to first plate 172 and the selected plate 174 assures that transition arm 182 remains rigid and fixed with respect to plates 172 and 174 and second tube 120 as sweeper-suction assembly 170 rotates.

Mounted on and extending downwardly from transition arm 182 is a transition arm brush 198, illustrated in the drawings and numbered in FIG. 13. Transition arm brush 198 extends downwardly the same distance as plate brush 200 so that the bottom edges of transition arm brush 198 and plate brush 200 are horizontal, parallel with one another, and positioned at the same level respecting the upper surface of granular material 218 be removed from container 202. Similarly to plate brush 200, transition arm brush 98 is equipped with a transition arm brush shield 222, which is mounted on transition arm 182 in the same manner as plate brush shield 224 is mounted on plate 172, using suitable sheet metal screws or nut-bolt combinations. Transition arm brush shield 222 is preferably made of relatively rigid, preferably transparent plastic, the same as plate brush shield 224.

A main brush mounting arm 184 pivotally connects to transition arm 182 by operation of a hinge designated generally 190 and a spring designated 188, all as illustrated in FIGS. 10 and 12. As with sled mounting arm 180, main brush mounting arm 184 is preferably angular in construction, most preferably fabricated from angle iron, with main brush mounting arm having a horizontal portion 230 and a vertical portion 232 as shown and numbered in FIG. 13.

Hinge 190 includes a first hinge plate 194 that is secured to a vertically extending portion of transition arm 182, and a second hinge plate 196 that is secured to vertical portion 232 of main brush mounting arm 184. Securement of hinge plates 194 and 196 to transition arm 182 and main brush mounting arm 184 is preferably by nut and bolt combinations. The hinge connection of main brush mounting arm 184 to transition arm 182 permits pivoting motion of main brush mounting arm 184 relative to transition arm 182. This is apparent when comparing FIG. 10 and FIG. 12 where FIG. 10 shows main brush mounting arm 184 in facing contact with a extremity portion of transition arm 182, while FIG. 12 illustrates main brush mounting arm 184 having pivoted about hinge pin 192 into a position spaced away from the extremity of transition arm 182. This pivoting connection permits main brush mounting arm 184 to move if and when main brush mounting arm 184 contacts an interior wall surface of wall 206 of a container 202, during rotation of sweeper-suction assembly 170, as is illustrated in FIG. 12. A tension spring 188 connects the proximate end of main brush mounting arm 184 to transition arm 182 to bias main brush mounting arm 184 towards the position at which main brush mounting arm 184 faceingly contacts the outer extremity of transition arm 182, as illustrated in FIG. 10.

Main brush mounting arm 184 carries a main brush 186, which is preferably mounted on and connected to main brush mounting arm vertical portion 232 by suitable nuts and bolts, or by sheet metal screws, or by adhesive fastening. As with transition arm brush 198 and plate brush 200, main brush 186 is protected by a main brush shield 220, which like transition arm brush shield 222 and plate brush shield 224 is preferably relatively rigid plastic, most preferably transparent plastic, and extends vertically downwardly from connection with and parallel to main brush mounting arm vertical portion 232 as illustrated in FIG. 14.

Sweeper suction assembly 170 further includes a suction tube designated generally 208, with suction tube 208 including a flexible segment 210 and a rigid segment 212. Suction tube 208 is connected to the horizontally extending end of elbow section 176 of second tube 120 in a substantially air tight manner so that vacuum may be drawn through suction tube 208, to draw granular resin pellets 218 into and through suction tube 208 and up second tube 120 to a location remote from container 202.

The end of suction tube 208 remote from connection with elbow section 176 of second tube 120 is defined by an end fitting 216 fitted on the terminus of suction tube 208 with end fitting 216 including an intake orifice formed therein and designated 214 as illustrated in FIG. 12.

In operation, the container emptying apparatus assembly 1 is placed on a, preferably, flat surface, such as a manufacturing or warehouse floor. Plate 70 is lifted along vertical risers 60 of extension assembly 20, by way of pulley system and the wheels 75 and track assembly, such that the plate is proximate to its uppermost position, i.e. proximate horizontal rail 65. This, in turn, raises first tube 65, second tube 120, and sweeper-suction assembly 170 including suction tube 208 to a point where container 202 may be positioned beneath base platform 10, between legs 40. Container 202 may be positioned beneath base platform 10 by a forklift, a conveyer belt, a rail system, or any other manual or automatic means known in the art for moving a storage load. Once container 202 is in position and the top of container 202 is opened, plate 70 is lowered, again by way of the pulley and track/wheel systems, such that sweeper-suction assembly 170 and second tube 120 are lowered into container 202. Preferably, plate 70 is lowered until suction tube 208 contacts the upper surface of the contents of container 202 where, due to the rigidity of second tube 120 and first tube 95, the plate 70 is thereby held in position above base platform 10 and along extension assembly 20.

Counterforce, provided by a spring or a counterweight, provides a counter to the weight of the plate, the motor, and the second tube 120 and sweeper-suction assembly 170. The counterforce may be applied by a spring connecting plate 70 to horizontal rail 65, but is preferably provided by cable 252 connected to plate 70 and further connected to counterbalancing weight 254 through pulley 250 attached to horizontal rail 65. This counterforce functions to reduce the downward force on the granular material. Accordingly, the counterforce together with the action of sled 178 causes sweeper-suction assembly 170 to remain on top of the resin and prevents the weight of plate 70, motor 135 and sweeper-suction assembly 170 from causing assembly 170 to dig into the granular material. The resulting combined counterforce is of such a magnitude that sweeper-suction assembly 170 remains on the top of the pile of granular material and drops only as granular material 218 is removed from container 202.

In a preferred embodiment, this downward force exerted by plate 70, motor 135, and tubes 95, 120 and 208, etc., is reduced by the counterforce to approximately three pounds.

Once sweeper-suction assembly 170 is in the preferred starting position, an operator may then energize motor 135 and the vacuum source. Alternatively, and preferably, the vacuum created by the activation of the vacuum source closes a switch, which automatically energizes motor 135. Motor 135 then causes first pulley wheel 136 to rotate. The motion is transferred to second tube 120 and sweeper-suction assembly 170 by way of second pulley wheel 137 and the belt, wire, rope, etc. 138. While sweeper-suction assembly 170 and second tube 120 are rotating, a suction force is drawn through suction tube 208 by way the vacuum source and fitting 216 facilitates applying vacuum to the granular material. Hence, suction tube 208 suctions and removes the granular material from within container 202 as sweeper-suction assembly 170 rotates. The suctioned granular material, thereby, travels from container 202 through suction tube 208, second tube 120, and first tube 95, ultimately to piping or tubing, or other similar means often used in conveying lines, or to wherever it the granular or powdery material is needed for manufacturing purposes.

The container emptying apparatus assembly 1 of this invention removes the granular material such as resin from the top down. As the material from the top of the container is removed, plate 70, by way of the pulley and the wheel and tracks, is lowered along the extension assembly 20 and sweeper-suction assembly 170 is further lowered into the interior of container 202. In other words, plate 70 and the sweeper-suction assembly 170 are lowered further into the container as granular material is evacuated until, eventually, sweeper-suction assembly 170 reaches the bottom of container 202 and removes the last of the granular material.

Based on the foregoing, the apparatus is advantageous because it covers the entire area of the container without operator intervention. More specifically, once sweeper-suction assembly 170 and second tube 120 are lowered into the container and the motor and vacuum source are activated, the apparatus of the invention is able to suction substantially the entire contents of the container due to the rotation of second tube 120 and sweeper-suction assembly 170. This action is performed without need for an operator or employee to continuously check the container emptying apparatus and ensure that it is operating correctly. The invention suctions substantially the entire area of the container, thereby, removing substantially the contents contained therein. To this extent, the invention reduces costs of labor for removing the contents of the container and boosts overall productivity.

In operation, sweeper-suction assembly 170 functions to move particulate matter from the center of the container to the periphery of the container. More specifically, as the motor causes second tube 120 and sweeper-suction assembly 170 to rotate, in accordance with the above, sweeper-suction assembly 170 rotates about the axis of second tube 120. In doing so, the brushes 186, 198, 200 of sweeper-suction assembly 170 urge the granular material away from the center of container 202 and towards sides 206 of container 202. This action is advantageous because it forces the material within container 202 toward the area though which intake surface 214 of suction tube 208 "sweeps", facilitating removal of the granular material from container 202. Thus, an exceedingly high percentage of granular material may be removed from container 202 without operator or employee intervention.

Apparatus of the invention automatically removes material from a Gaylord or Octobin type of container without the need for human intervention. The apparatus continuously sweeps the top level of the contents of the container towards the outer edges of the container. The material is vacuumed up by the rotating assembly consisting of first and second tubes 95, 120 as disclosed above, which in turn are connected to suction tube 208 having a rigid segment 212 providing a wand assembly that rotates with second tube 120. As the sweeper-suction assembly 170 rotates, granular material is drawn up through flexible tube 208, second tube 120, first tube 95 and into the manufacturing process.

Motor 135 that rotates tubes 120 and 208 is preferably only activated when vacuum is sensed from the conveying system in the facility in which the container emptying apparatus is used. As the container emptying apparatus unloads granular material from the Gaylord or Octobin container, the counterbalance system described above allows the motor and control assembly, traveling downward on track 77 on riser assembly 20, to follow the level of the granular material as the granular material is removed and the level of material drops. The rotating action of sweeper-suction assembly 170 moves the granular material into position to be vacuumed out of container 202 by encounter with intake orifice 214 of suction tube 208 and slot openings which may optionally be positioned in suction tube rigid element 212.

The apparatus of the invention needs no heavy duty hydraulics with pinch points. The low torque motor and low rotation speed of the sweeper-suction assembly provide inherent safety. No guards are required. With the apparatus of the invention, a pallet jack can move a container of interest into position; a forklift truck is not required.

Apparatus of the invention does not require compressed air.

Motor 135 operates on 115 volt power and typically draws fewer than 2 amps during operation.

A vacuum switch is preferably provided to allow apparatus of the invention to operate only while the facility vacuum system is pulling vacuum. Accordingly, the apparatus of the invention is always ready and never has to be manually started or stopped. Desirably, a jog button is provided to rotate the unit manually.

Preferably the frame of the apparatus is fabricated from structural steel.

First tube 95 is preferably one-and-a half, two inch or two-and-one-half inch diameter aluminum.

Second tube 120 is preferably rotated at about one revolution per minute.

Suction tube 208 is preferably about three feet long, and further preferably includes not only intake orifice 214, but also slots, not shown in the drawings, in suction tube rigid segment 212 to facilitate vacuum draw of granular material into suction tube 208. As second tube 120 rotates, suction tube 208 is dragged across the top of the granular material, in a swept back, trailing manner, reaching into each corner of the container and repeatedly vacuuming granular material from the sides and corners of the container. The counterbalanced spring loaded cable, together with the action of sled 178, prevents the sweeper-suction assembly 170 and tube 120 from burying in the granular material due to their weight.

Brushes 186, 198 and 200 are preferably fibrous material, but may be stainless steel, depending on the coarseness and hardness of the granular material being removed from the container.

Because in the course of operation of the invention granular material is constantly moved to the vacuum pick-up point, there is no need for an operator to manually move suction tube 208. Once an operator has positioned a container under the apparatus, with a container opening located to receive sweeper-suction assembly 170, and once the sweeper-suction assembly is lowered into position contacting the upper surface of the granular material in the container, and once vacuum is applied and the vacuum switch energizes motor 135, no further intervention by an operator is required until the container is empty and must be removed. At that point, an operator raises the base platform 10 and the components connected thereto, including sweeper-suction assembly 170, removes the empty container from beneath the apparatus and replaces the container with another container, whereupon the process repeats. Typically, operator activity takes about 20 minutes total per container to be emptied. This includes the operator's time to remove the emptied container, position a new container underneath the apparatus, open the top of the container, position the open top underneath sweeper-suction assembly 170 and lower base platform 10 and the components connected thereto until sweeper-suction assembly 170 rests on the top surface of the granular material in the container to be emptied. Once this has been done, as soon as the vacuum switch triggers operation of motor 135, the container begins to empty.

I claim the following:

1. Apparatus for unloading granular material from a container having concave interior corners, comprising:
   (a) a frame having a portion held above the ground by a plurality of legs;
   (b) a first tube connected to the frame for vertical movement with respect thereto, adapted for vacuum communication with a vacuum source;
   (c) a second tube having a first end rotatably connected to and in communication with the first tube, extending downwardly into the container over which the frame has been placed, including an elbow portion proximate a second end of the second tube;
   (d) a suction tube including a flexible portion and having a first end in communication with the elbow portion of the second tube;
   (e) a motor connected to the frame for vertical movement with respect thereto, being coupled to the second tube to rotate the second tube and the suction tube; and
   (f) a brush connected to the second tube and extending therefrom for urging granular material towards the interior periphery of the container as the brush rotates with the second tube, for granular material collection by vacuum at an open second end of the suction tube.

2. Apparatus of claim 1 further comprising a plurality of brushes connected to the second tube and extending therefrom for urging granular material towards the interior periphery of the container as the brushes rotates with the second tube, for granular material collection by suction at an open second end of the flexible tube.

3. Apparatus of claim 2 further comprising:
   (a) a brush supporting arm pivotally connected to the second tube, for carrying at least one of the brushes as the second tube rotates, the supporting arm being movable pivotally upon encountering a wall of the container during rotation of the second tube; and
   (b) a spring for biasing the supporting arm towards the second tube about the pivotal connection therewith.

4. Apparatus of claim 1 further comprising:
   (a) a brush supporting arm pivotally connected to the second tube, for carrying the brush as the second tube rotates, the supporting arm being movable pivotally upon encountering a wall of the container during rotation of the second tube; and
   (b) a spring for biasing the supporting arm towards the second tube about the pivotal connection therewith.

5. Apparatus of claim 1 further comprising a longitudinally elongated sled connected to the second tube and movable therewith for smoothing and sweeping the surface of resinous material in the container as the second tube is rotated by the motor and for resisting downward digging by the flexible tube and the brush into the granular material within the container in response to upward force on the sheet as the sheet encounters and sweeps the surface of the granular material.

6. Apparatus of claim 5 where in the brush and the sled are coplanar.

7. Apparatus of claim 6 wherein the suction tube is longer than distance from the axis of rotation of the second tube to a farthest interior corner of the container.

8. Apparatus of claim 5 where in the brush and the sled are parallel.

9. Apparatus of claim 1 wherein the brush is horizontal.

10. Apparatus of claim 1 wherein the frame further comprises a portion extending upwardly having rails for vertical movement of a base platform, the motor and the first, second and suction tubes therealong, with upward movement being in response to operator applied pull and downward movement being in response to drop of material level within the container being emptied.

11. Apparatus of claim 10 wherein the frame is angle iron.

12. Apparatus of claim 1 wherein the suction tube is between about one and one-half and about two and one half inches in diameter.

13. Apparatus of claim 1 wherein the brush bristles are perpendicular to the granular material.

14. Apparatus of claim 1 wherein the suction tube is longer than distance from the axis of rotation of the second tube to a farthest interior corner of the container.

15. Apparatus of claim 1 further comprising a counterbalance connected to the frame for countering weight of the structure of elements "c" through "f" of claim 1 as the container empties of granular material.

16. Apparatus of claim 1 wherein the first and second tubes are coaxial.

17. A method for unloading granular material from a container having concave interior corners without continuous operator intervention, comprising:
 (a) positioning a frame over an opening in the top of the container;
 (b) providing a tubular member having rotatable and stationary portions connected to the frame in a manner to be moveable vertically with respect thereto, the stationary portion of the tubular member being connectable at a first end to a vacuum source so as to have vacuum drawn through the tubular member, the rotatable and stationary portions of the tubular member being coupled for vacuum communication therebetween, the rotatable portion of the tubular member extending downwardly into the container opening and having an elbow proximate a second end of the tubular member and a flexible portion intermediate the elbow and the second end;
 (c) drawing vacuum in the tubular member with the vacuum source;
 (d) rotating the rotatable portion of the tubular member along the top of granular material in the container to draw granular material, by vacuum created suction, into the second end of the tubular member while rotatably angularly sweeping remaining granular material towards the periphery of the container interior to encounter the second end of the tubular member and be drawn thereinto by said vacuum created suction.

18. Apparatus for emptying a Gaylord or Octobin container of granular material, comprising:
 (a) a frame having a portion positionable above a container to be emptied;
 (b) a motor connected to the frame;
 (c) a tubular member rotatably connected to the frame positionable portion and coupled to the motor for rotation of a lower portion thereof by the motor, the tubular member having an upper portion first end adapted for connection to a vacuum source, having a flexible segment proximate an open second end of a lower portion to suck granular material within the container into the tubular member in response to vacuum drawn by the vacuum source as the tubular member rotates;
 (d) a horizontally oriented longitudinally elongated brush connected to and rotatable with the tubular member for horizontally sweeping granular material towards the container walls into position to encounter the tubular member second end as the lower portion of the tubular member rotates; and
 (e) a longitudinally elongated bendable sheet connected to the tubular member at a common axial position thereon with the elongated brush, movable in a smoothing, sweeping action along the surface of resinous material in the container as the tubular member is rotated by the motor, for resisting downward digging by the tubular member and the brush into the granular material within the container in response to upward force on the sheet as the sheet encounters and sweeps along the surface of the granular material within the container.

19. Apparatus of claim 18 wherein the brush is parallel with the bendable sheet.

20. A method for emptying granular or powdery material from a Gaylord or Octobin container, comprising:
 (a) providing a frame sized to fit over an opening in the top of the container;
 (b) connecting a first tube having a first end in fluid communication with a vacuum source slidably to the frame for vertical motion respecting the frame;
 (c) connecting a first end of a second tube to a remaining end of the first tube to be rotatable respecting the first tube and moveable vertically unitarily therewith;
 (d) positioning the container within the frame with the opening under a second end of the second tube, the second end of the second tube opening horizontally;
 (e) rotating
  (i) the second tube with the second end contacting an upper surface of the granular material in the container while drawing vacuum through the first and second tubes; and
  (ii) a flexible sled connected to the second tube, for smoothingly sweepingly along the upper surface of the granular material within the container with a curved leading edge to resist any tendency of the second tube to dig into the granular material.

* * * * *